United States Patent [19]

Matthews

[11] Patent Number: 4,788,796
[45] Date of Patent: Dec. 6, 1988

[54] REMOVABLE REAR TRUCK WINDOW

[76] Inventor: Mark E. Matthews, 102 Woodland Rd., Mauldin, S.C. 29662

[21] Appl. No.: 86,778

[22] Filed: Aug. 19, 1987

[51] Int. Cl.⁴ .............................................. E05D 15/06
[52] U.S. Cl. ....................................... 49/404; 49/408; 292/288; 292/147; 292/DIG. 46
[58] Field of Search ................... 49/404, 408; 292/288, 292/147, DIG. 46, DIG. 47

[56] References Cited

U.S. PATENT DOCUMENTS

| | | | |
|---|---|---|---|
| 895,808 | 8/1908 | Steele | 292/147 |
| 1,858,109 | 5/1932 | Pauli | 49/408 X |
| 3,807,779 | 4/1974 | Enders | 292/DIG. 46 X |
| 3,877,261 | 4/1975 | Robins | 292/147 X |
| 4,268,074 | 5/1981 | Alexander | 292/288 X |
| 4,293,154 | 10/1981 | Cassells | 292/DIG. 47 X |
| 4,327,524 | 5/1982 | van der Laan | 49/408 X |
| 4,514,996 | 5/1985 | Sjogren | 292/147 X |

Primary Examiner—Joseph Falk
Attorney, Agent, or Firm—Jerry T. Kearns

[57] ABSTRACT

A removable sliding window assembly for use in pickup trucks and camper shells has a frame in which tracks are formed in which sliding panels are received. Retaining pin assemblies are used to removably secure the panels in the tracks. When the retaining pins are removed, the panels may be removed from the track assembly.

10 Claims, 2 Drawing Sheets

REMOVABLE REAR TRUCK WINDOW

BACKGROUND OF THE INVENTION

Field of the Invention

The present invention relates to removable rear truck windows, and more particularly pertains to a sliding removable rear window assembly for a pickup truck which may also be used in a camper shell.

Description of the Prior Art

Various types of sliding windows are utilized in the prior art as rear windows in pickup trucks and as windows in camper shells. However, there is a need for a completely removable window in which the panels may be removed from the frame when desired. Often times, a camper shell is mounted on the bed of a pickup truck and it is desired to have a passage between the camper shell and the cab of the truck. In order to accomplish this objective, the prior art devices provide for a sliding of the panels of a window between closed and open positions. A window provided at the front of the camper shell also utilizes a sliding panel construction. Typically, a rubber sealing boot is installed between the cab of the truck and the camper shell. However, the prior art windows do not allow for the complete removal of the sliding panels and allow only a limited access between a camper shell and a truck cab.

Various types of window assemblies for vehicles are disclosed by the prior art. For example, U.S. Pat. No. 2,556,062, which issued to G. Buehrig on June 5, 1951, discloses a "T" top assembly for motor vehicle. U.S. Pat. No. 2,922,473, which issued to R. Le Bron on Jan. 26, 1960, discloses a removable side window for a vehicle. U.S. Pat. No. 4,220,298, which issued to K. Willis on Sept. 2, 1980, discloses a removable soft door assembly for use in aircraft. U.S. Pat. No, 4,482,023, which issued to L. Dziedzic on Nov. 13, 1984, discloses a removable panel assembly used in a cab of a tractor. U.S. Pat. No. 4,518,195, which issued to G. Tindall on May 21, 1985, also discloses a removable window for a tractor cab.

However, none of the prior art devices successfully addresses the problem of providing a window assembly for use in pickup trucks and camper shells in which the sliding panels may be easily and readily removed, and yet be securely maintained in the window frame when desired. Thus, it can be appreciated that there is a continuing need for, and interest in, improvements to such removable window assemblies, and in this respect, the present invention addresses this need and interest.

SUMMARY OF THE INVENTION

In view of the foregoing disadvantages inherent in the known types of removable rear truck windows now present in the prior art, the present invention provides an improved removable rear truck window. As such, the general purpose of the present invention, which will be described subsequently in greater detail, is to provide a new and improved removable rear truck window which has all the advantages of the prior art removable rear truck windows and none of the disadvantages.

To attain this, an illustrative embodiment of the concepts of the present invention is shown in the drawings, and makes use of a frame assembly which defines a central opening. The frame includes tracks for the reception of sliding panels and also includes retaining pins for maintaining the sliding panels secured in the tracks. Upon removal of the retaining pins, the sliding panels may be lifted upwardly in the tracks and by tilting the bottom of the panels outwardly of the frame, the panels may be readily removed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved removable rear truck window which has all the advantages of the prior art removable truck windows and none of the disadvantages.

It is another object of the present invention to provide a new and improved removable rear truck window which may be easily and efficiently manufactured and marketed.

It is a further object of the present invention to provide a new and improved removable rear truck window which is of a durable and reliable construction.

An even further object of the present invention is to provide a new and improved removable rear truck window which is susceptible of a low cost of manufacture with regard to both materials and labor, and which accordingly is then susceptible of low prices of sale to the consuming public, thereby making such removable rear truck windows economically available to the buying public.

Still yet another object of the present invention is to provide a new and improved removable rear truck window which provides in the apparatuses and methods of the prior art some of the advantages thereof, while simultaneously overcoming some of the disadvantages normally associated therewith.

Still another object of the present invention is to provide a new and improved removable rear truck window assembly in which the panels may be selectively removed or retained in position by use of retaining pins.

Yet another object of the present invention is to provide a new and improved removable rear truck window which may be utilized in a camper shell and the rear window of a pickup truck cab to provide communication between the camper shell and the pickup truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
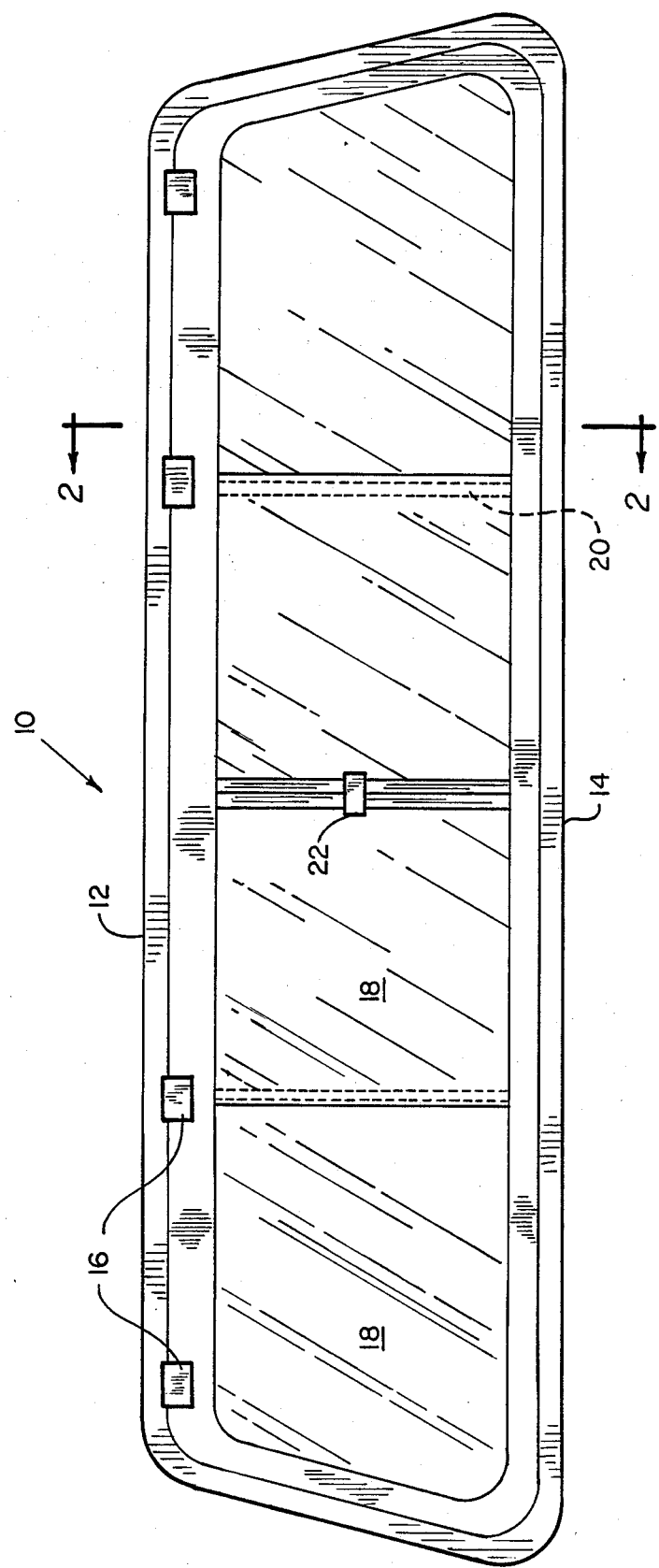
FIG. 1 is a front view of a sliding removable window assembly as would be seen from inside the cab of a pickup truck.

With reference now to the drawings, and in particular to FIG. 1 thereof, a new and improved removable rear truck window embodying the principles and concepts of the present invention and generally designated by the reference numeral 10 will be described.

More specifically, it will be noted that the first embodiment 10 of the invention includes a generally rectangular frame having an upper portion 12 and a lower portion 14 which define a central opening. Sliding panels 18, of whch four are illustrated, may be of glass, plastic or any other suitable construction and may also be constructed of a screen material. A sealer piece 20, formed of a felt like material, is received between the sliding panels and is used to prevent the flow of air between these panels. A latch 22 is provided to secure the panels in a closed position. A plurality of retaining pin assemblies 16 are spaced along the top frame portion 12.

Figure 2:
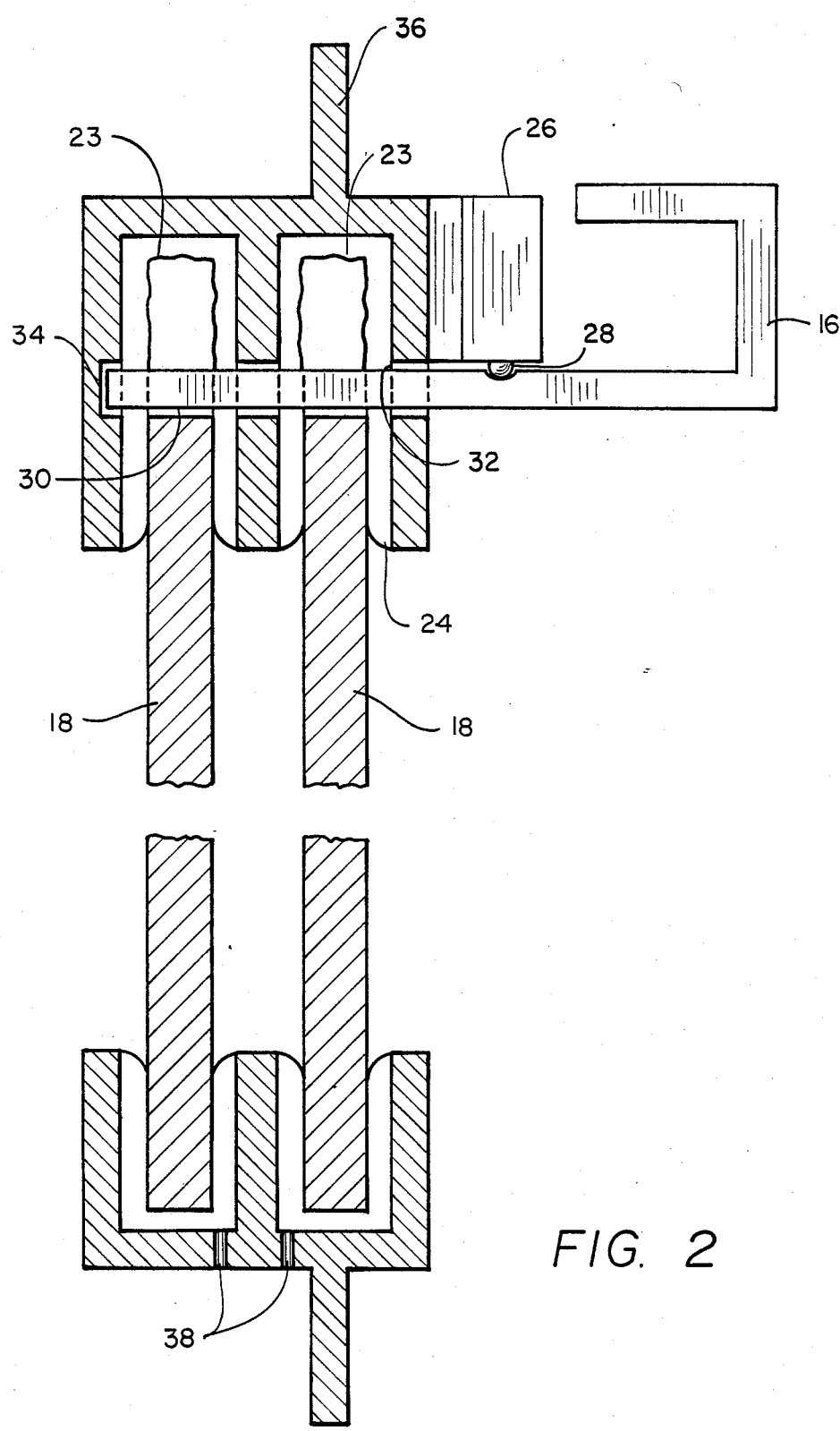
FIG. 2 is a cross-sectional view along lines 2—2 of FIG. 1.

With reference now to FIG. 2, a cross-sectional view of the window assembly is illustrated. The window frame is of an extruded aluminum material and forms a plurality of adjacent tracks 23. A felt track liner 24 is provided in each of the tracks 23 as a seal for sliding panels 18. A mounting flange 36 extends outwardly around the frame and is used for mounting the window assembly in the vehicle. A retaining pin 16, having a "U" shaped handle portion, is received in an aperture 32 formed transversely through the upper portion 12 of the window frame. A lock for the retaining pin 16 is in the form of a spring ball detent retainer 26 which is received in a recess 28 in retaining pin 16. The end of the retaining pin is received in a notch 34 in the window frame. If it is desired to maintain one of the sliding panels in a stationary non-sliding condition, the retaining pin 16 may be received in a notch cut out portion 30 of the sliding panel. Drain holes 38 are spaced along the bottom portion 14 of the frame to allow moisture and water vapor to drain out of the window frame assembly.

In use of the removable sliding window assembly, retaining pins 16, which are spaced along the top portion of the frame, are removed, the sliding panels 18 are lifted upwardly into the upper portion of the tracks 23 in the upper frame portion 12, and then the bottom of the panels 18 is tilted outwardly of the track means in the lower frame portion 14. Then, sliding panels 18 are moved downwardly out of the frame. It is contemplated that padded vinyl storage pouches for the sliding panels will be provided. These panels may then be conveniently stored behind the seat in the pickup truck cab. To reinstall the sliding panels 18, the retaining pins 16 are first removed, the sliding panels are inserted upwardly into the tracks 23 in the upper frame portion 12, then the bottom portion of the panels are inserted into the tracks of the lower frame portion. The panels are then allowed to slide downwardly into the tracks of the lower frame portion and the retaining pins 16 are inserted through apertures 32 until the spring ball detent 26 is received in the recess 28 of the retaining pin 16.

By providing a camper shell with the removable window sliding window assembly of the present invention, and also providing a pickup truck cab with the same window assembly, complete communication between the pickup truck cab and the camper shell interior may be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A removable sliding window for use in motor vehicles and camper shells comprising:
   a generally rectangular frame having upper and lower portions which define a central opening;
   said frame having a plurality of adjacent tracks opening inwardly towards said central opening and extending around said frame;
   a plurality of panels received for overlapping sliding movement in said tracks for selectively opening and closing at least a portion of said central opening;
   at least one aperture extending transversely through said upper portion of said frame;
   said aperture terminating in a recessed notch in an inner wall of said frame;

at least one retaining pin removably received in said aperture and having one end removably received in said recessed notch for limiting upward movement of said plurality of panels in said track of said upper frame portion;

a spring urged ball detent mounted adjacent said aperture on said upper frame portion, said spring urged ball mounted for movement transversely to a longitudinal axis of said aperture;

and a recess in said retaining pin for locking engagement with said spring urged ball detent.

2. The removable sliding window of claim 1, further comprising a mounting flange extending outwardly around said frame.

3. The removable sliding window of claim 1, wherein a track felt lining is provided in said plurality of adjacent tracks.

4. The removable sliding window of claim 1, wherein sealing means is provided between said plurality of panel means.

5. The removable sliding window of claim 1, wherein at least one of said panels includes a notch in which said retaining pin is received.

6. The removable sliding window of claim 1, wherein a plurality of drain holes are provided along said lower frame portion.

7. The removable sliding window of claim 1, wherein a plurality of transversely extending apertures are provided through said upper portion of said frame and a plurality of retaining pins are received in said apertures.

8. The removable sliding window of claim 1, wherein said frame and said tracks are constructed of extruded aluminum.

9. The removable sliding window of claim 1, further comprising latch means for securing said panels in a closed position.

10. The removable sliding window of claim 1 wherein said retaining pin means has a generally "U" shaped handle portion.

* * * * *